Jan. 18, 1938.  W. E. BOWER  2,105,470
APPARATUS FOR TIMING
Filed Oct. 8, 1935
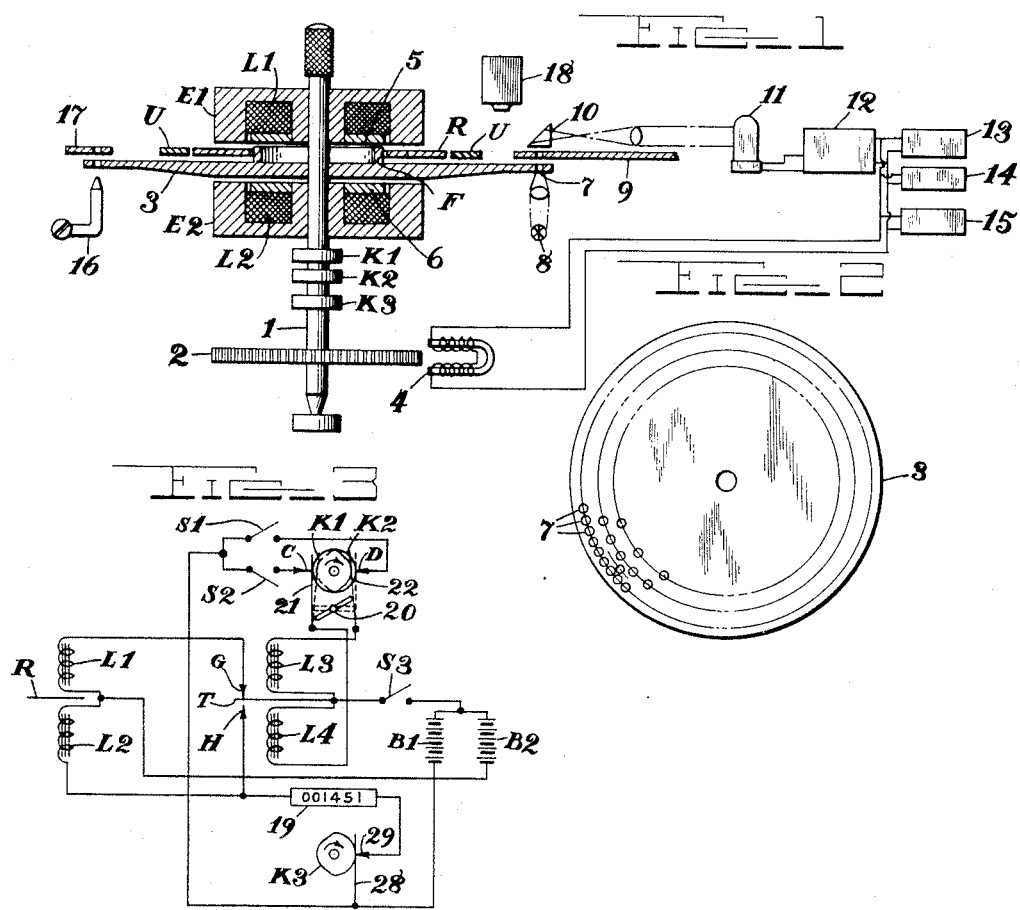
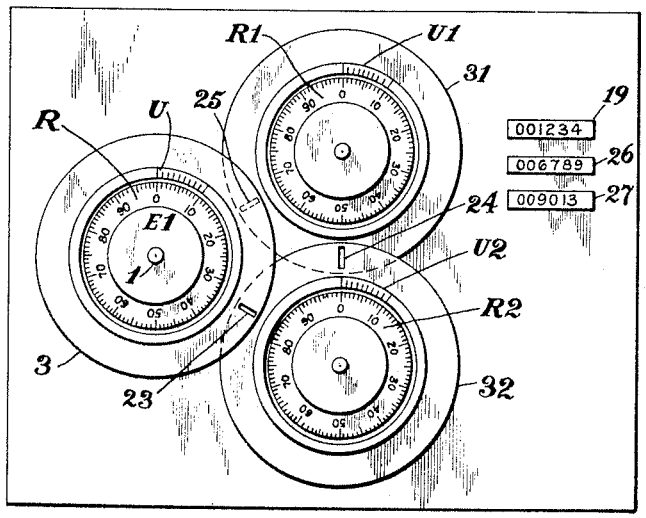
INVENTOR
Ward E. Bower
BY
Robert A. Lavender
ATTORNEY

UNITED STATES PATENT OFFICE 2,105,470

APPARATUS FOR TIMING

Ward E. Bower, Washington, D. C.

Application October 8, 1935, Serial No. 44,072

5 Claims. (Cl. 161—15)

(Granted under the act of March 3, 1883, as amended April 30, 1928; 370 O. G. 757)

This invention relates to a method of and apparatus for timing and more particularly to a method of and an apparatus for measuring the time elapsing between the occurrence of two successive events in which the unit of time (one second) may be divided into ten thousand or less equal parts.

In modern usage we can no longer rely upon any one gear in a gear train in a clock mechanism as having a constant angular velocity with respect to the escapement fly wheel at the head of this train. Neither may we expect a sufficiently constant reciprocating oscillation in the escapement fly wheel of a clock gear train even though a constant force is continually applied to the driving gear. This is due simply to the inaccuracies unavoidable in the dividing head mechanism of the milling machine or dies used in producing said gears introducing errors that can not be accepted in modern demands.

In order to eliminate gear train clockwork as far as possible, it has been proposed to derive timing impulses from a sub-multiple harmonic generator of the thermionic tube type actuated by oscillations from a relatively stable source. However, due to the inherent tendency of such harmonic generators to slip to another frequency and the inflexibility of such systems, a method of and apparatus for subdividing a constant frequency into any desired ratio of subdivided frequency to frequency being subdivided has been devised together with means for producing audible sounds at the subdivided frequency and means for recording the subdivided frequency accurately to a fractional part of the time period of one complete cycle of the undivided or fundamental frequency, so that each fractional part of one complete cycle bears a true relation one to the other at all times and shows no wending effect when referred to other portions of the cycle so subdivided.

One of the principal objects of this invention is to provide a method of and an apparatus for determining the total number of whole cycles and the fractional parts of a cycle of alternating current of known frequency that are generated between the happening of two successive events between which it is desired to measure the elapsed time.

Another object of this invention is to provide a means for subdividing a constant frequency of known periodicity into any desired ratio of subdivided frequency to frequency being subdivided.

A further object of this invention is to provide a means for accurately determining the difference frequency interval between any two or more standard frequency sources together with means for accurately recording the beats produced.

Other and further objects of this invention will be apparent from the following specification and the accompanying drawing in which:

Fig. 1 shows schematically and partially in section one of the revolving members and certain of the other associated elements of the system;

Fig. 2 is a plan view of the disc 3 showing one arrangement of the apertures therein;

Fig. 3 is a schematic circuit diagram of the electrical circuits of the system; and Fig. 4 is a top plan view of a timing mechanism employing three independently driven rotating members together with means for determining when any two of the members are rotating in phase and/or in synchronism with each other.

Referring to the accompanying drawing in which like characters of reference indicate the same parts in the different figures, 1 denotes the shaft of a synchronous motor of the "La Cour" wheel type, 2 is the rotating armature fixed to the shaft, 3 is a disc fixedly mounted on the shaft and adapted to rotate therewith while 4 is the A. C. excited field of the motor which is selectively connectible by switches S4 to a source of constant frequency (source not shown) of some known periodicity as for example 1,000 cycles per second or to the output of amplifier 12, hereafter described.

In the present case the armature 2 is notched with 100 notches so that the shaft 1 will rotate exactly 10 revolutions per second when the field 4 is excited from a source of 1,000 cycles per second.

Semicircular cams K1, K2, and K3 are fixed to shaft 1 to rotate therewith. Cams K1 and K2 are arranged at 180° phase relation one to the other, while cam K3 is timed at 90° to cams K1 and K2.

Surrounding the shaft 1 adjacent to the top and bottom of disc 3 are situated two stationary circular electromagnets E1 and E2. A very light ring R of paramagnetic material such as iron is situated above the disc 3 between the pole faces of electromagnets E1 and E2 and is free to float between the disc 3 and magnet E1. The ring R is induced to remain in concentric conjugation with the stationary members and the revolving members by having an annular flange F turned on disc 3 and around which ring R is disposed, a construction that is conventional and not a part of applicant's invention. The ring R is engraved with a fiducial line of reference parallel to its equatorial radius. The electromagnets E1 and E2 have windings L1 and L2 included therein and these windings are covered partially by circular discs 5 and 6 of magnetic material. Associated with one side of the disc 3 is a source of light 8 and opposite thereto is a member 9 containing an aperture beyond which there is a reflecting prism 10 adapted to reflect a ray of light emanating from the source 8 through an aperture 7 in the disc 3, through the aperture in the member 9, to the reflecting prism 10, and thence to a photo-electric cell 11 which is connected in the input circuit of an amplifier 12 the output of which may be connected to various means such as the relay 13, recorder 14, or converter 15, or in accordance with the disclosure in my Patent 2,000,010, May 7, 1935, it may be utilized to drive the armature 2, as indicated in Fig. 1. Adjacent to another point on the periphery of the disc 3 is located an air jet 16 and an apertured member 17 cooperating therewith. The members 16 and 17 may be moved radially of the disc 3 in order to select any desired row of the holes 7 therein and likewise the source of light 8, apertured member 9, and reflecting prism 10 may be moved radially of the disc to cooperate with the rows of holes 7 on the various radii of the disc. In a preferred embodiment of the system, the disc 3 is pierced with 1,000 equally spaced holes on its largest possible radius, 800 on its next largest radius, 500 on the next, 100 on the next, 10 on the next, and 1 on the inner radius. With this arrangement and with the disc 3 rotating at a speed of 10 complete revolutions per second I readily have a means of multiplying or dividing the original frequency $F_0$ (1,000 cycles) by any decimal fraction of two significant figures or whole numbers within the physical possibilities of the mechanical device. Adjacent to the disc 3 there is located a stationary scale U for cooperation with the revolving ring R. At 18 there is located a camera by means of which photographs may be made to record the instantaneous positions of the rotating discs.

A plan view of the revolving disc 3 is shown in Fig. 2 with several rows of holes located at different radii. It is to be understood that the revolving discs may be made easily detachable from the driving shaft 1 and that various discs may be made with various numbers of holes of various sizes and shapes to suit special requirements. In Fig. 3 the cams K1, K2, and K3, the electromagnet coils L1 and L2 are shown connected in circuit. One terminal of coil L1 is connected to the high potential side of battery B2 while the other terminal thereof is connected to the relay contact G, one terminal of coil L2 is connected to the high potential side of B2 while the other terminal is connected to the relay contact H. Associated with the relay contacts G and H is a relay armature or tongue T which may be connected by means of switch S3 to the low potential side of battery B2. The armature T has associated therewith relay coils L3 and L4 for moving the armature either to the contact G or the contact H. Coil L3 has one terminal thereof connected to the armature T and switch S3 while the other terminal thereof is connected to a spring 22 normally actuated by cam K2. Coil L4 has one terminal thereof connected to the relay armature T and to switch S3 while the other terminal thereof is connected to the spring 21 normally actuated by cam K1. Associated with spring 21 there is a contact C against which spring 21 is caused to lie when the protruding part of the cam K1 is against spring 21. Contact D is associated with spring 22 and a circuit is made from spring 22 to contact D when the cam K2 presses the spring 22 thereagainst. Switches S1 and S2 are connected to the high potential side of battery B1. The switches S1 and S2 connect the battery B1 to contacts D and C, respectively. The low potential side of the battery B1 is connected to one side of the switch S3. Associated with the cam springs 21 and 22 is a hand-operated cam or button 20 adapted to raise the springs 21 and 22 off of the cam surfaces of cams K1 and K2 and to hold them against the respective contacts C and D when the cam 20 is turned to the position indicated by dotted lines in Fig. 3. Associated with cam K3 is a spring 28 and contact 29. When the cam K3 is in the position shown, contacts 28 and 29 are closed. Contact 29 is connected by way of the electric counter 19 to the relay contact H while spring 28 is connected to the high potential side of battery B1.

In the above description of Figs. 1, 2, and 3 a single unit only is shown. In Fig. 4, three rotating discs are shown at 3, 31, and 32. These discs are mounted on separate shafts driven independently by three sources of driving frequency. In addition to the holes 7 in disc 3 as disclosed hereinbefore, the discs 3, 31, and 32 in the arrangement as shown in Fig. 4 are provided with apertures 23, 24, and 25, respectively, and the discs are arranged to overlap one another so that it may be determined whether any two of the discs are rotating in phase and in synchronism. Counters 26 and 27 are associated with the discs 31 and 32 in the same manner that counter 19 is associated with disc 3.

The operation of the system is as follows: The field 4 of the synchronous motor is excited from a standard source of known frequency, (in the present case preferably 1,000 cycles) so that the notched armature 2, shaft 1, and disc 3 rotate at exactly 10 revolutions per second. It is desired to derive an audible note having a frequency of some harmonic of 10 cycles per second, the air jet 16 and the member 17 are moved radially of the disc 3 until they are aligned with that row of holes corresponding with the desired harmonic. A stop-cock associated with jet 16 is then opened and a musical note may be heard corresponding to the frequency at which the air jet is interrupted. When an audible indication of the division of time is not required and it is desired to obtain a frequency based upon the rotational speed of the disc 3 as a standard, the source of light 8, and members 9 and 10 are moved to the position desired radially of the disc 3 in which case the rotating disc 3 chops the light falling on photoelectric cell 11 at some frequency determined by the speed of rotation of the disc 3 and the number of holes at the radius selected. The light impulses falling on photoelectric cell 11 are amplified by amplifier 12 and passed to any one or all of the devices 13, 14, and 15. Recorder 14 is used to record the equal intervals of time of passing of light between the revolving disc 3 and the selective apertured member 9 or between any two or more revolving discs when the number of revolutions per second of one of the discs is known. In the high frequencies where it is not possible to record photographically, the amplified electrical pulses can be used to charge or discharge an inductive and capacitive circuit thus converting the electrical pulses into sinusoidal oscillations which are the source of alternating current of very definite frequency. Where it is desired, the oscillations after being passed through one or more tuned circuits may be applied to energize the field 4 of the synchronous motor in a manner somewhat similar to that disclosed in my Patent No. 2,000,010 granted May 7, 1935. By selecting the proper number of apertures, the system may be used to derive frequencies in the region of 10 to 200 pulses per second which may be used as standard timing units. Any desirable whole even or odd number of pulses per revolution of the disc may be selected and the interval between each two succeeding pulses is equally spaced.

Where it is desired to time accurately to 1/10,000th of a second events occurring on the same or different days, the arrangement is employed as follows: The button or hand-operated cam 20 (Fig. 3) is turned to raise the springs 21 and 22 in contact with contacts C and D, respectively. The switch S3 is closed while the synchronous motor is being driven from the standard source. Switch S1 is then closed in which case relay winding L3 is energized, attracting relay armature T to contact G, closing the circuit of electromagnet winding L1 which causes the ring R to be attracted towards E1 and stopped. In this position R is held firmly against E1 by current flowing through L1; the counter 19 is now read as it is in central position. Switch S1 is then opened and the ring R remains in its upward position against the stationary scale because the armature T is of the type that stays in the position to which it was last moved. After the counter 19 has been read and the relation of the graduations on ring R and scale U has been noted and it is desired to use the device for timing an event, as for instance, a race, the switch S2 is closed to begin the timing. When S2 is first closed the relay winding L4 is energized by way of switch S3 from battery B1 and switch S2. This causes the attraction of relay armature T to contact H and the consequent energization of the electromagnet winding L2 which is energized from battery B2 by way of contact H, armature T, and switch S3. Upon the energization of electromagnet winding L2 the ring R will leave E1 in an attempt to go to E2 by virtue of the magnetic pull exerted thereon. It will be drawn up against the rotating disc 3 substantially instantaneously and caused to revolve at the same angular velocity as the disc. Each time the disc 3 makes one complete revolution, the cam K3 completes the circuit with the electrical counter 19 and measures a complete revolution. Before the termination of the race or the interval being timed, the switch S2 is opened and at the exact end of the time interval being measured the switch S1 is closed at which time relay winding L3 energizes to raise the armature T and stop the further operation of the counter 19 and complete a circuit to electromagnet winding L1 to cause the ring R to be drawn away from the revolving disc 3 and stopped. The reading of the time elapsed may now be taken by reading the counter 19 and deducting therefrom the number of revolutions indicated by it at the beginning of the timing and adding to this quantity the fractional part of a revolution indicated by the ring R. With the ring R divided into 100 equal parts by radial lines and revolving 10 times per second, it is seen that each complete division thereon corresponds to an elapsed time of 1/1,000th of a second. By further subdividing the ring R or providing a vernier scale on the member U, it is possible to readily divide a second into 10,000 equal parts with a high degree of accuracy.

In order to check possible errors due to differences in the time of transit of the ring R to or from E1 or E2, the button or hand-operated cam 20 may be turned to such a position as to permit the springs 21 and 22 to ride upon the cams K1 and K2, respectively, in which case the ring R may be attracted to E1 and read. The switch S2 may be closed in which case L3 and L4 will be alternately energized, thus causing the relay armature T to lie against contact G for one revolution and then against contact H for the next revolution in which case the ring R will be thrown alternately from electromagnet E1 to electromagnet E2. When the ring R has passed back and forth from electromagnet E1 to electromagnet E2 100 times or 1,000 times or any other desired number of times, the switch S2 may be opened and the ring R may be read with respect to the scale U in order to determine the cumulative error of slippage incident to a great number of transits. In one embodiment of the device as constructed by applicant, this error due to slippage of the ring was found to be less than 1/40,000th of a second for a complete transit to and from the rotating disc.

In this arrangement three synchronous motors with identical or similar mechanism as above set forth may be used, all of which can be mounted symmetrically together but independent of the same frequency control. Each one or any two may differ from 1,000 cycles per second by a difference determined solely by the mechanical and electrical characteristics of the members themselves. In the arrangement shown in Fig. 4 the positioning of the revolving members is such as to bring any two revolving discs one over the other. The discs may have round, square or rectangular holes or specially designed slits, scrolls or spirals in them to produce any desired shaped pulsating wave form in amplifier 12 and associated networks. On discs 3, 31, and 32, I use one slit in each disc. If the angular velocity of each disc is different, it is so arranged that these slits come into conjugation at certain intervals of time. These coincident intervals are called beats and may be accurately measured in terms of the rotation of one disc against standard time. At a time when the slits are becoming adjacent, a light may be made to pass through the increasing opening and operate a system similar to 8, 9, 10, 11, 12, 13, 14, and 15. The impulses generated may be counted visually or electrically.

A further refinement is shown in Fig. 1, where 18 is a camera located in such a position as to be able to photograph all three revolving members at any instant of time and which can be controlled by any one of the three electrical counters previously described, or by any associated circuit of 13, 14, or converter 15, or manually.

Fig. 4 depicts the view of the three synchronous motor discs 3, 31, and 32 together with their respective counters 19, 26, and 27 which are within the focal limits of the camera lens. It is quite obvious that from two pictures of this surface taken with a definite interval of time elapsing, one can record with an accuracy of one part in ten thousand the whole and fractional part of the number of revolutions these discs have made during that known elapsed time. With this procedure the accuracy of my timing mechanism may be determined.

This invention may be manufactured and used by or for the Government of the United States without the payment of royalties thereon.

What is claimed is:

1. In a device for measuring time to a small fraction of a second, a continuously rotating disc rotating at a predetermined definite speed, a relatively light magnetic ring coaxially mounted in juxtaposition to said rotating disc, said magnetic ring being provided with indicia thereon, a first electromagnet for moving said magnetic ring into close physical contact with said rotating disc so that said magnetic ring turns with said rotating disc, a stationary element, a second electromagnet associated with said stationary element for moving said magnetic ring away from said rotating disc into close physical contact with said stationary element, a stationary member bearing a fiducial line of reference located adjacent to said magnetic ring, means for energizing the first electromagnet for moving said magnetic ring into contact with said rotating disc at the beginning of a time interval to be measured, and means for deenergizing the first electromagnet and energizing the second electromagnet for moving said magnetic ring away from said rotating disc and into physical contact with said stationary element at the end of a time interval to be measured.

2. In a device for measuring time to a small fraction of a second, a continuously rotating disc rotating at a predetermined definite speed, a relatively light magnetic ring coaxially mounted in juxtaposition to said rotating disc, said magnetic ring being provided with indicia thereon, a first electromagnet for moving said magnetic ring into close physical contact with said rotating disc so that said magnetic ring turns with said rotating disc, a stationary element, a second electromagnet associated with said stationary element for moving said magnetic ring away from said rotating disc into close physical contact with said stationary element, a stationary member bearing a fiducial line of reference located adjacent to said magnetic ring, means for energizing the first electromagnet for moving said magnetic ring into contact with said rotating disc at the beginning of a time interval to be measured, means for deenergizing the first electromagnet and energizing the second electromagnet for moving said magnetic ring away from said rotating disc and into physical contact with said stationary element at the end of a time interval to be measured, and means for registering the whole number of revolutions made by the rotating disc between the energization of said first electromagnet and the energization of said second electromagnet.

3. In a device for measuring time to a small fraction of a second, a continuously rotating disc rotating at a predetermined definite speed, a relatively light magnetic ring coaxially and floatably disposed in juxtaposition to said rotating disc, said magnetic ring being provided with indicia thereon, a first electromagnet for moving said magnetic ring into close physical contact with said rotating disc so that said magnetic ring turns with said rotating disc, a stationary element, a second electromagnet associated with said stationary element for moving said magnetic ring away from said rotating disc into close physical contact with said stationary element, a stationary member bearing a fiducial line of reference located adjacent to said magnetic ring, means for energizing the first electromagnet for moving said magnetic ring into contact with said rotating disc at the beginning of a time interval to be measured, and means for deenergizing the first electromagnet and energizing the second electromagnet for moving said magnetic ring away from said rotating disc and into physical contact with said stationary element at the end of a time interval to be measured.

4. In a timing device for measuring time to a small fraction of a second, a continuously rotating disc rotating at a predetermined definite speed, a relatively light magnetic ring coaxially and floatably disposed in juxtaposition to said rotating disc, said magnetic ring being provided with indicia thereon, a first electromagnet for moving said magnetic ring into close physical contact with said rotating disc so that said magnetic ring turns with said rotating disc, a stationary element, a second electromagnet associated with said stationary element for moving said magnetic ring away from said rotating disc into close physical contact with said stationary element, a stationary member bearing a fiducial line of reference located adjacent to said magnetic ring, means for energizing the first electromagnet for moving said magnetic ring into contact with said rotating disc at the beginning of a time interval to be measured, means for deenergizing the first electromagnet and energizing the second electromagnet for moving said magnetic ring away from said rotating disc and into physical contact with said stationary element at the end of a time interval to be measured, and means for registering the whole number of revolutions made by the rotating disc between the energization of said first electromagnet and the energization of said second electromagnet.

5. In a timing device, a rotatable shaft, a disc fixed on said shaft to rotate therewith, a stationary electromagnet disposed adjacent each face of said disc, a light paramagnetic ring floatably mounted between said disc and one of said electromagnets, and means to energize and deenergize said electromagnets in accordance with events to be timed.

WARD E. BOWER.